CHARLOTTE H. STERLING.
Improvement in Dish-Washers.

No. 130,761.  Patented Aug. 20, 1872.

WITNESSES.
E. Lyon Corbin
J. West Wagner

Inventor.
Charlotte H. Sterling
by Johnson Klaucke & Co
her Attorneys

UNITED STATES PATENT OFFICE.

CHARLOTTE H. STERLING, OF GAMBIER, OHIO.

IMPROVEMENT IN DISH-WASHERS.

Specification forming part of Letters Patent No. 130,761, dated August 20, 1872.

*To all whom it may concern:*

Be it known that I, CHARLOTTE H. STERLING, of Gambier, in the county of Knox and State of Ohio, have invented certain new and useful Improvement in Dish-Washing Machines, of which the following is a specification:

My invention relates to a portable apparatus for washing dishes; and my said invention consists of a wire-gauze cylinder provided with interior longitudinal bars having their inner sides notched, the notches being graduated to receive and hold plates of different sizes to be washed, the said cylinder being also provided with adjustable reticulated transverse partitions secured within the notches to form an interior separate compartment for the reception of cups and small dishes, the plates and the removable partitions being held in place by a removable bar and a hinged cover, the said cylinder so filled with dishes being supported upon bearings within a rack, which is placed into a vessel containing hot soap-suds, wherein the cylinder is revolved and the dishes washed, rinsed, and removed with the rack to a suitable place for drying, when they are readily removed therefrom.

Figure 1:
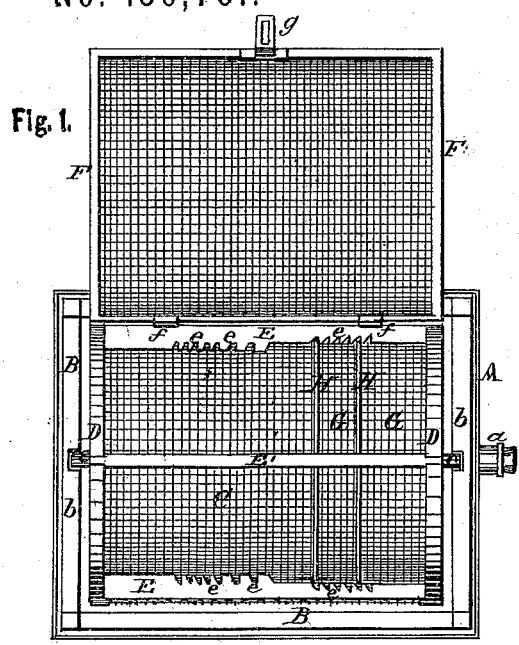
Figure 2:
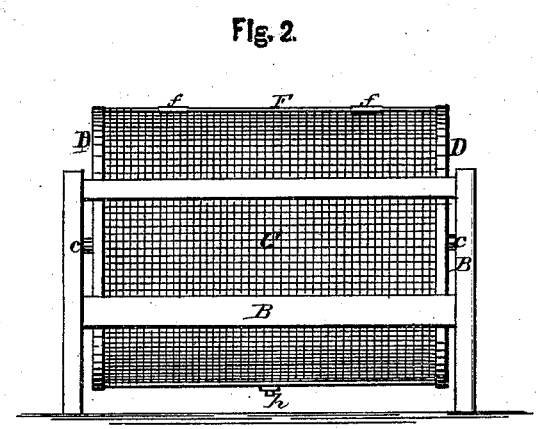
Figure 3:
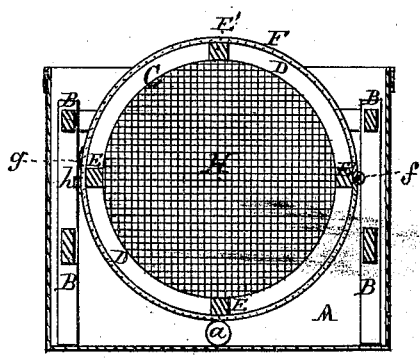

In the accompanying drawing, Figure 1 represents a top or plan view of the cylinder and rack in position in the tank. Fig. 2 represents a side elevation of the rack with the cylinder in it, but separate from the tank. Fig. 3 represents a vertical cross-section of the cylinder, rack, and tank; and Fig. 4, a longitudinal vertical section of the same.

Figure 4:
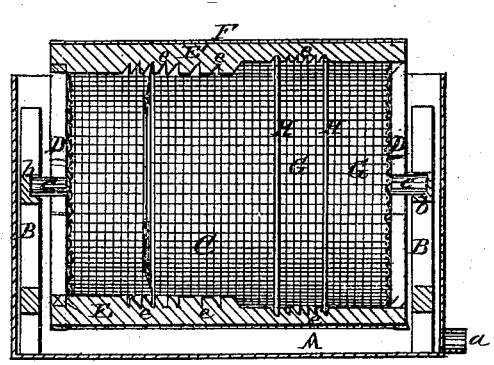

The tank of my improved dish-washing machine may be square or may have a curved bottom and stand on feet, and may be permanently attached in any convenient place—as, for instance, near a sink and hot-water pipes—or it may be made removable. It is provided with an outlet-pipe, *a*, at one end, near its bottom, for the ready drawing off the water from the same. Into this tank fits a rack or frame, B, suitably constructed to receive between its sides the cylinder C, the end pivots *c* of which have proper bearings in the end pieces *b* of the rack in which to revolve. The cylinder C consists of two circular end pieces or disks, D, connected to each other by any suitable number of bars, E, the inner faces of which bars are provided with notches *e*, the notches in the narrow part of the bar receiving the large plates and those in the wider part the smaller. One-half of the cylinder is covered permanently with wire-gauze, while the gauze of the other half is attached to a curved frame, F, and forms a lid hinged to one of the bars E at *f*. The bar E', under the lid F, is made removable, so as to be easily taken out when the dishes are put into the cylinder, and as readily replaced previous to closing the lid. The lid F is provided with a hasp, *g*, which, passing over a staple, *h*, on the cylinder, holds the lid down while the cylinder is revolved. The disks D have a sufficient portion of their surface cut out without interfering with their strength, and are covered on the inside with wire-gauze to allow free ingress and egress at the ends as well as on the periphery of the cylinder. The notches of the bars may be also utilized to receive transverse wire partitions H, so as to form one or more compartments, G, which may be increased or diminished in size, as may be desired, to receive and hold cups and other smaller articles to be washed, and thus separate them from the larger dish-department, as shown in Fig. 4. This arrangement is of great advantage; and, moreover, these partitions may be removed in order to use the entire cylinder for the washing of large plates, and the smaller articles may be inclosed and washed by themselves.

In using my improved machine the cylinder is placed in its bearings in the rack, which is opened, and the bar E' removed. Plates and similar dishes, which cannot be held by the notches, are placed in spaces G formed by wire-gauze disks H, which fit in and between the notches of the bars, and may be placed nearer to or further from each other, according to the space required for the dishes to be washed. The bar E' is then replaced, its notches, which correspond with the notches in the other bars, fitting over the plates and disks, and firmly securing them in place. The lid is now put down and locked, and serves as an additional guard to keep the bar E' in place. The rack with the filled cylinder is now placed into the tank, and, the outlet-pipe *a* being closed, the tank is filled with hot soap-suds and water to a little above the pivots of the cylinder. The water may be much hotter than could be used were the dishes washed by hand; and the cylinder being revolved a few times the hot water passes through every part of the cylinder from end to end and rapidly washes the dishes clean. The disks H allow the water to pass freely through them, but keep the cups and small dishes in the space G without allowing them to come into contact with the plates, and without their being thrown about. The dirty water is now drawn off through pipe a, the latter closed again, and the tank again filled with clean hot water, and the cylinder being again revolved a few times the dishes will be perfectly rinsed. The rack and cylinder are then removed from the tank and placed on the range, stove, register, or any other suitable place to dry, after which the dishes may be removed from the cylinder.

It will be readily understood that where there are many dishes to wash two or more cylinders and racks may be used with the same tank, and another tank filled with rinsing-water may be used; and also that if a tank is used with a curved bottom, in which the rack could not well stand, suitable bearings for the pivots of the cylinder may be formed on the ends of the tank, and the cylinder placed for washing and rinsing dishes into the tank without the rack, while the latter in that case serves to hold the cylinder while drying the dishes. The tank, rack, and cylinder may be made of any suitable material, and of any desired size.

Having described my invention, I claim—

1. In a dish-washing machine, the revolving gauze-cylinder C, provided with lid F and notched bars E E', constructed and operating essentially as described.

2. In combination with the cylinder C, constructed substantially as described, I claim the tank A and the rack B, operating and constructed essentially as described.

3. In combination with the cylinder C having notched bars E E', I claim the removable wire-gauze disks H to form spaces G in the cylinder, essentially as and for the purpose described.

In testimony whereof I have hereunto set my hand in the presence of the undersigned witnesses this 27th day of January, A. D. 1872.

CHARLOTTE H. STERLING.

Witnesses:
 JOSEPH LEONARD,
 WILLIAM H. MORRELL.